United States Patent [19]

Jorgensen

[11] Patent Number: 4,892,211

[45] Date of Patent: Jan. 9, 1990

[54] CEILING BOXES FOR CEILING FAN SUPPORT

[75] Inventor: Robert W. Jorgensen, Niles, Mich.

[73] Assignee: Hubbell Incorporated, Orange, Conn.

[21] Appl. No.: 182,413

[22] Filed: Apr. 18, 1988

[51] Int. Cl.$^4$ .............................................. H02G 3/08
[52] U.S. Cl. ...................................... 220/3.2; 248/343; 248/906
[58] Field of Search ......... 248/343, 342, 344, DIG. 6, 248/57, 318; 52/39; 220/3.2, 3.5; 174/54, 57

[56] References Cited

U.S. PATENT DOCUMENTS

| | | | |
|---|---|---|---|
| 1,477,806 | 12/1923 | Bonnell | 220/3.2 |
| 3,474,994 | 10/1969 | Swanquist | 248/DIG. 6 X |
| 3,676,570 | 7/1972 | Gabb | 248/343 X |
| 3,930,631 | 1/1976 | Laarm | 248/343 |
| 4,048,491 | 9/1977 | Wessman | 248/343 X |
| 4,576,349 | 3/1986 | Dearing | 248/DIG. 6 X |
| 4,645,158 | 2/1987 | Manning | 248/343 |
| 4,684,092 | 8/1987 | Reiker | 248/343 X |

OTHER PUBLICATIONS

Raco Inc. Catalog, 1984, two pages, One labelled "Copyright 1984", and the other labelled "B25".

*Primary Examiner*—Ramon O. Ramirez
*Attorney, Agent, or Firm*—Jerry M. Presson; Alfred N. Goodman

[57] ABSTRACT

A ceiling box for mounting and supporting a ceiling fan thereto. The ceiling box includes a top wall portion with a side wall portion surrounding the periphery of the top wall portion. The box is open at the end opposite the top wall portion and the side wall portion has a pair of flanges extending normal thereto into the open end of the box. These flanges have holes therein for receiving fan supporting screws. In a first embodiment, a pair of threaded mounting screw holes are formed in the top wall portion and are each axially aligned with an unthreaded hole that extends through the respective flange. In a second embodiment, the holes in the flanges are also threaded for added support.

15 Claims, 2 Drawing Sheets

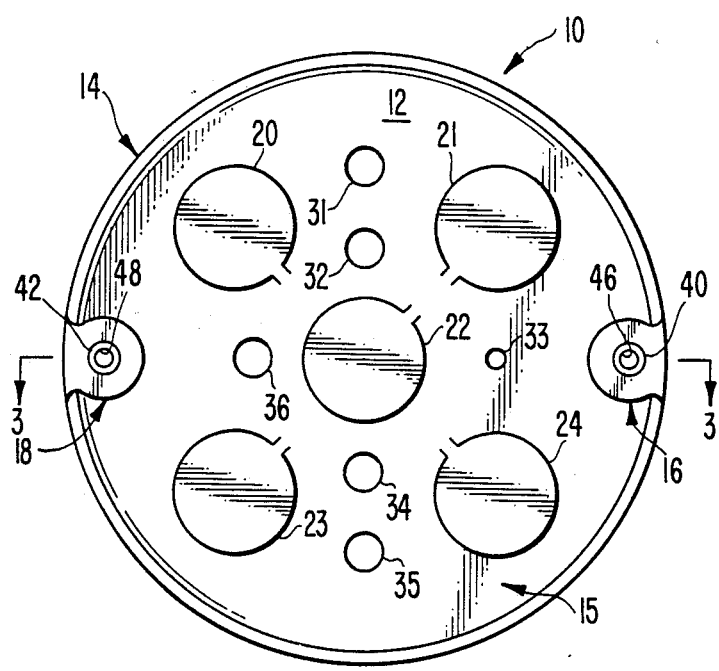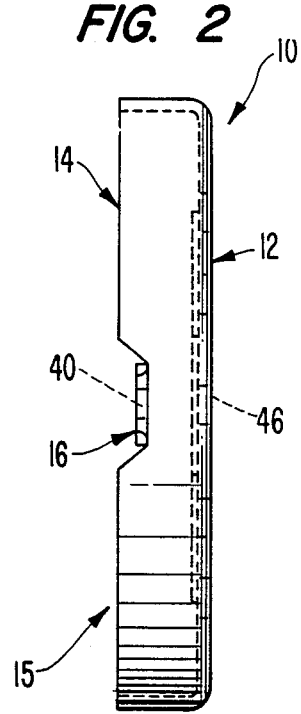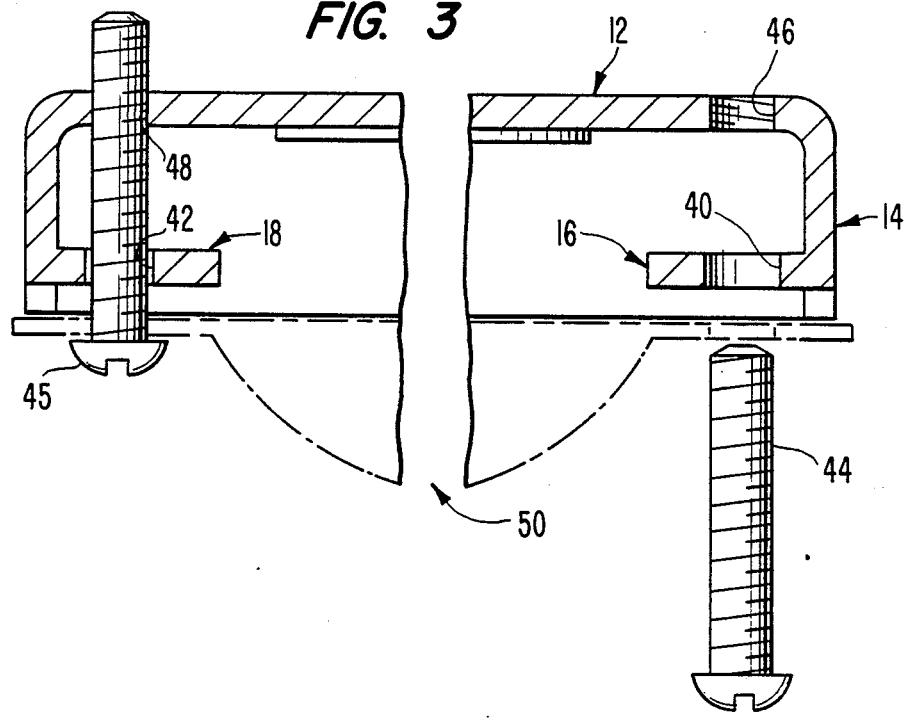

4,892,211

CEILING BOXES FOR CEILING FAN SUPPORT

FIELD OF THE INVENTION

The invention relates to a special ceiling box, or ceiling pan, for directly mounting a ceiling fan thereto and in which the ceiling box is the sole support for the ceiling fan. More specifically, the invention relates to improving the resistance to fatigue of ceiling box mounting flanges resulting from the dynamic loads of an unbalanced ceiling fan.

BACKGROUND OF THE INVENTION

Ceiling fans have become increasingly popular in today's homes and businesses, such as restaurants. In the past, ceiling boxes, known as ceiling pans, for supporting the fans were tested under static loads only. With the increasing popularity of ceiling fans came the concern that the dynamic loads of an unbalanced ceiling fan could cause the mounting flanges of the ceiling boxes to flex and eventually break off. This concern lead to a new 1987 N.E.C. code provision (N.E.C. 370-17C) that required ceiling boxes intended to be used as the sole support of ceiling fans to be tested and listed for that use. Underwriters Laboratories (U.L.) responded with a new test which no ceiling box has yet been able to pass.

The prior art ceiling boxes are made of metal and have a pair of mounting flanges with a threaded mounting hole extending through each flange. In essence, these flanges are small ears formed integrally with the wall of the box and bent inwardly. The ceiling fan is attached to the ceiling box by a pair of mounting screws which are threadedly received in the mounting holes of the pair of flanges. Some prior art ceiling boxes have clearance holes in the top wall aligned with the mounting holes in the flanges to accommodate long mounting screws. These clearance holes neither provide support nor stabilize the mounting screws. Thus, the fan is merely supported and secured by the pair of mounting flanges extending from the ceiling box.

The problem with these prior art ceiling boxes is that the unbalanced dynamic loads cause the fan to rock back and forth, which in turn flexes and ultimately fatigues the flanges of the metal ceiling box until they break off.

SUMMARY OF THE INVENTION

Accordingly, a primary object of the invention is to provide a ceiling box that resists the fatigue resulting from unbalanced dynamic loads.

Another object of the invention is to provide a ceiling box that meets the new U.L. test for ceiling fans.

Another object of the invention is to minimize the amount of modifications necessary to adapt the existing ceiling boxes to meet the new U.L. test, thus reducing tooling costs.

The foregoing objects are basically attained by providing a ceiling box having two threaded mounting holes in the top wall portion of the ceiling box, which are axially aligned respectively with two threaded or unthreaded holes extending through two flanges. Each threaded mounting hole and threaded or unthreaded hole in each flange receives one of the mounting screws therein, to resist screw wobble and flange flex and fatigue.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form part of this original disclosure:

FIG. 1 is a bottom plan view of the first embodiment of the ceiling box in accordance with the invention;

FIG. 2 is a right side elevational view of the ceiling box shown in FIG. 1;

FIG. 3 is a fragmentary front elevational view in cross section of the box shown in FIG. 1 taken along line 3—3 with the fan housing shown in phantom lines and secured to the ceiling box at one flange and about to be secured at the other flange by mounting screws;

DETAILED DESCRIPTION OF THE INVENTION

Figure 4:
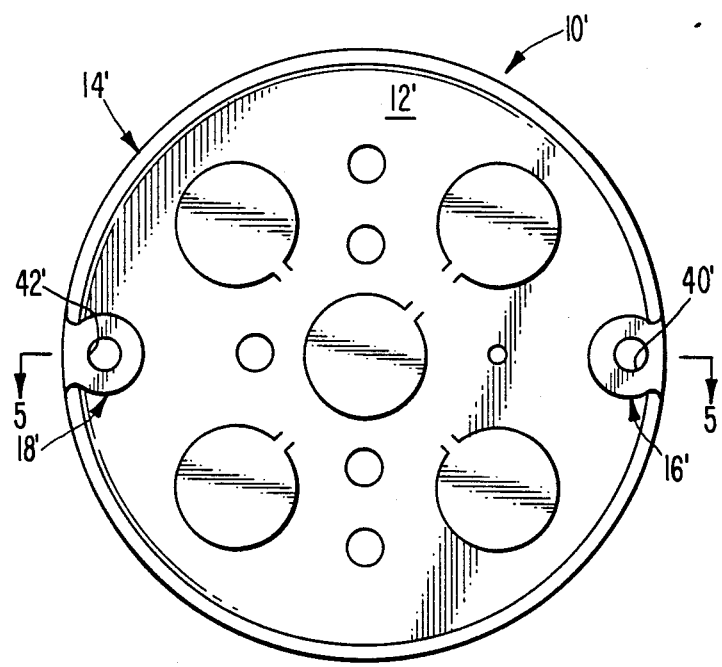
FIG. 4 is a bottom plan view of the second embodiment of the ceiling box in accordance with the invention.

Referring now to FIGS. 1 and 2, the ceiling box 10 comprises a planar top wall portion 12 and a substantially cylindrical side wall portion 14 extending normal to and coupled to the periphery thereof.

The end 15 of the box 10 opposite the top wall portion is open. A pair of flanges, or ears, 16 and 18 are formed integrally with wall portion 14 and are bent inwardly from the side wall portion to extend normal thereto into open end 15.

The top wall portion 12 includes a plurality of breakout windows 20-24. While five breakout windows are shown in the drawings, the ceiling box 10 may be manufactured with more or less breakout windows as needed. These breakout windows 20-24 are selectively broken away to allow electrical wires to pass into the ceiling box for connection with the fan. Also, a plurality of auxiliary holes 31-36 extend through the top wall portion for mounting the ceiling box 10 to a support or the like by auxiliary screws or bolts. These holes 31-36 may be threaded or unthreaded depending upon the desired mounting arrangement of the ceiling box 10 to the ceiling, while hole 33 is preferably threaded for receiving a conventional green grounding screw.

Referring now to FIG. 3, the flanges 16 and 18 have holes 40 and 42, respectively, extending therethrough. Each hole has a substantially cylindrical surface with a longitudinal axis substantially perpendicular to the respective flange and to the wall portion 12. The diameter of each hole is just large enough to allow the mounting screws 44 and 45 to pass freely therethrough. Top wall portion 12 has a pair of threaded cylindrical mounting screw holes 46 and 48, which are axially aligned with holes 40 and 42, normal to the top wall portion and threadedly receive mounting screws 44 and 45 for securing the fan housing 50 to the ceiling box 10. The flanges 16 and 18 and top wall portion 12 in this mounting arrangement stabilize the mounting screws 44 and 45 by limiting the travel of the screws under the rocking movement of an unbalanced fan.

Figure 5:
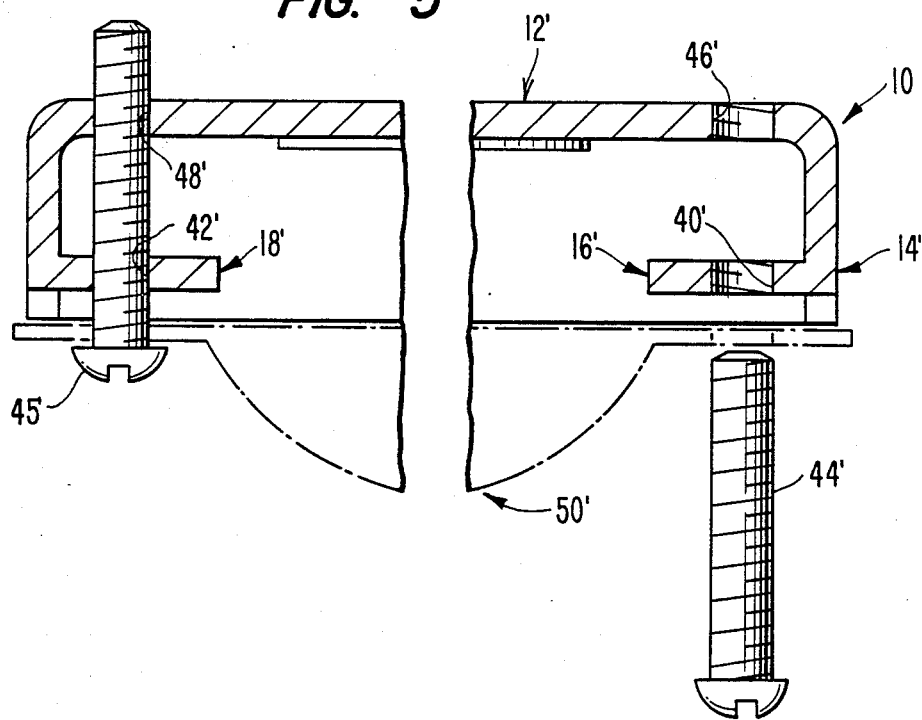
FIG. 5 is a fragmentary front elevational view in cross section of the box shown in FIG. 4 taken along line 5—5 with the fan housing shown in phantom lines and secured to the ceiling box at one flange, and about to be secured at the other flange by mounting screws.

As seen in FIGS. 3 and 5, the mounting screws 44, 44', 45 and 45' are conventional No. 8/32 screws, although they can also be No. 6/32 or 10/32 screws. The designation "No. 8", for example, indicates that, based on the American Standard Coarse and Fine Threads definition, the basic major diameter, or the outer diameter, of the threads at the crest is 0.164 inch. The designation "/32" indicates that there are 32 threads per inch on the screw's externally threaded body.

Referring now to FIGS. 4 and 5, a second embodiment of the invention comprises ceiling box 10' which has a pair of flanges 16' and 18' with threaded holes 40' and 42' extending therethrough, respectively. These holes 40' and 42' are axially aligned with mounting screw holes 46' and 48' extending through the top wall portion 12', respectively. In this mounting arrangement, shown in FIG. 5, the mounting screws 44' and 45' are supported and secured against movement at both the flanges 16' and 18' and the top wall portion 12' for securing the fan housing 50' to the ceiling box 10'. The remaining parts of ceiling box 10' are identical to the ceiling box 10 described above.

Both embodiments alleviate the prior art's inherent problem of the flanges breaking off due to fatigue by securing the mounting screws directly to the top wall portion of the ceiling box rather than only to the flanges The mounting screws are supported against movement in two axially spaced locations. By supporting the mounting screws in two axially spaced locations, the dynamic load on the mounting screws resulting from an unbalanced fan is distributed along the length of the mounting screws. Also by securing the mounting screws to the top wall of the ceiling box, the fan is supported by the entire ceiling box rather than merely by two small metal flanges that may fatigue and break off.

The first embodiment, shown in FIGS. 1–3, is the best design from the manufacturer's point of view, because a minimum amount of tooling is needed to manufacture the ceiling box 10. In this embodiment, a four inch ceiling box 10 is stamped out of galvanized steel sheet metal. The threaded screw holes 46 and 48 are drilled or punched to a 0.150 inch diameter and then roll tapped for threadedly engaging a No. 8/32 mounting screw. The holes 40 and 42 in flanges 16 and 18, respectively, are drilled or punched to a 0.188 inch diameter to allow a No. 8/32 mounting screw to pass freely therethrough and threadedly engage screw holes 46 and 48.

The second embodiment, shown in FIGS. 4 and 5, is the best design for the ultimate performance; however, additional tooling is required to tap the holes 40' and 42' in the flanges 16' and 18'. In this embodiment, holes 40' and 42' in flanges 16' and 18', respectively, and threaded screw holes 46' and 48' are all drilled or punched to a 0.150 inch diameter and then roll tapped for threadedly engaging an 8/32 mounting screw.

While only two embodiments have been chosen to illustrate the invention, it will be understood by those skilled in the art that various changes and modifications can be made therein without departing from the scope of the invention as defined in the appended claims.

What is claimed is:

1. A ceiling box 10 adapted to mount and support a ceiling fan thereto via a pair of mounting screws and comprising:
    a top portion 12;
    a side portion 14, said side portion extending substantially normal and rigidly coupled to said top portion to form a box open at one end; and
    a pair of flanges 16,18 projecting substantially normal and rigidly coupled to said side portion, each of said flanges including a hole 40,42 extending normal therethrough;
    said top portion having a pair of threaded mounting holes extending normal therethrough, each of said mounting holes 46,48 being axially aligned with one of said flange holes, wherein each of said mounting holes and the respective aligned flange hole are adapted to receive a mounting screw for mounting and supporting the ceiling fan thereto, said mounting holes adapted to threadedly receive the mounting screws therein.
2. A ceiling box according to claim 1, wherein said flange holes are sized slightly larger than their respective axially aligned mounting holes for freely receiving a respective screw and supporting said screw therein.
3. A ceiling box according to claim 1, wherein said flanges are integral with said side portion and bent substantially normal to said side portion.
4. A ceiling box according to claim 1, wherein said side portion is substantially cylindrical.
5. A ceiling box according to claim 1, wherein said ceiling box is one integral unit stamped from galvanized steel.
6. A ceiling box according to claim 1, wherein said top portion includes at least one break-out window which is adapted to receive electrical wires after a portion thereof is broken away.
7. A ceiling box according to claim 1, wherein said top portion includes a plurality of auxiliary holes extending therethrough.
8. A ceiling box according to claim 7, wherein at least one of said auxiliary holes is threaded for receiving a threaded fastener.
9. A ceiling box according to claim 1, wherein said flange holes are threaded and adapted to threadedly engage a respective screw.
10. A ceiling box according to claim 9, wherein said top portion includes at least one break-out window which is adapted to receive electrical wires after a portion is broken away.
11. A ceiling box according to claim 9, wherein said top portion includes a plurality of auxiliary holes extending therethrough.
12. A ceiling box according to claim 11, wherein at least one of said auxiliary holes is threaded.
13. A ceiling box according to claim 9, wherein said flanges being integral with said side portion and bent substantially normal to said side portion.
14. A ceiling box according to claim 9, wherein said side portion is substantially cylindrical.
15. A ceiling box according to claim 9, wherein said ceiling box is one integral unit stamped from galvanized steel.

* * * * *